(12) United States Patent
Wu et al.

(10) Patent No.: US 11,184,142 B2
(45) Date of Patent: Nov. 23, 2021

(54) DISCONTINUOUS RECEPTION FOR CARRIER AGGREGATION

(75) Inventors: Chunli Wu, Beijing (CN); Benoist Pierre Sebire, Tokyo (JP)

(73) Assignee: Nokia Solutions and Networks Oy, Espoo (FI)

(*) Notice: Subject to any disclaimer, the term of this patent is extended or adjusted under 35 U.S.C. 154(b) by 713 days.

(21) Appl. No.: 14/115,884

(22) PCT Filed: Aug. 12, 2011

(86) PCT No.: PCT/EP2011/063952
§ 371 (c)(1),
(2), (4) Date: Nov. 6, 2013

(87) PCT Pub. No.: WO2013/023677
PCT Pub. Date: Feb. 21, 2013

(65) Prior Publication Data
US 2014/0086118 A1 Mar. 27, 2014

(51) Int. Cl.
 H04L 5/14 (2006.01)
 H04L 5/00 (2006.01)
 H04W 76/28 (2018.01)
(52) U.S. Cl.
 CPC ............. *H04L 5/14* (2013.01); *H04L 5/001* (2013.01); *H04L 5/0001* (2013.01); *H04W 76/28* (2018.02)
(58) Field of Classification Search
 CPC ......... H04L 5/14; H04L 5/0001; H04L 5/001; H04W 76/28
 See application file for complete search history.

(56) References Cited

U.S. PATENT DOCUMENTS

2010/0172272 A1* 7/2010 Tenny ................... H04W 24/00 370/280
2010/0322173 A1* 12/2010 Marinier ............. H04W 76/048 370/329

(Continued)

FOREIGN PATENT DOCUMENTS

CN 102075993 A * 5/2011
CN 102123447 A 7/2011

(Continued)

OTHER PUBLICATIONS

Discontinuous Reception (DRX) operation for TDD and FDD mode in Carrier Aggregation U.S. Appl. No. 61/483,407.*

(Continued)

*Primary Examiner* — Noel R Beharry
*Assistant Examiner* — Wilfred Thomas
(74) *Attorney, Agent, or Firm* — Harrington & Smith

(57) ABSTRACT

Methods and apparatuses for carrier aggregation with discontinuous reception is disclosed. At least two different time division duplexing configurations can be communicated from serving cells to a device, the subframes of the at least two different configurations being counted for purposes of operating at least one timer function according to a predefined rule of counting. Discontinuous communications by the serving cells with the device are controlled based on the predefined rule of counting such that at least one timer function associated with discontinuous reception from the serving cells is operated based on the counting.

24 Claims, 4 Drawing Sheets

```
┌─────────────────────────────────────────────┐
│ Receive at least two different TDD          │──50
│ configurations for different serving cells  │
└─────────────────────────────────────────────┘
                    │
                    ▼
┌─────────────────────────────────────────────┐
│ Count the subframes of the at least two     │──51
│ configurations based on a predefined rule   │
└─────────────────────────────────────────────┘
                    │
                    ▼
┌─────────────────────────────────────────────┐
│ Operate at least one DRX timer function based│──52
│ on the counting                              │
└─────────────────────────────────────────────┘
```

(56) References Cited

U.S. PATENT DOCUMENTS

| | | | | |
|---|---|---|---|---|
| 2010/0331019 | A1* | 12/2010 | Bhattacharjee ... | H04W 52/0229 455/458 |
| 2011/0021154 | A1* | 1/2011 | Marinier et al. ........... | 455/67.11 |
| 2011/0170420 | A1 | 7/2011 | Xi et al. ......................... | 370/241 |
| 2012/0063413 | A1* | 3/2012 | Kroener et al. .............. | 370/330 |
| 2012/0188903 | A1* | 7/2012 | Futaki ........................... | 370/252 |
| 2012/0281600 | A1* | 11/2012 | Tseng .................. | H04W 76/048 370/280 |
| 2012/0314637 | A1* | 12/2012 | Kim ..................... | H04L 1/1851 370/311 |
| 2013/0044674 | A1* | 2/2013 | Teyeb et al. .................. | 370/315 |
| 2013/0163497 | A1* | 6/2013 | Wei ...................... | H04L 5/0007 370/311 |
| 2013/0301421 | A1* | 11/2013 | Yi et al. ........................ | 370/241 |
| 2014/0036742 | A1* | 2/2014 | Charbit ............. | H04W 52/0235 370/280 |

FOREIGN PATENT DOCUMENTS

| | | |
|---|---|---|
| EP | 2600673 A1 | 6/2013 |
| WO | WO 2010/147956 A2 | 12/2010 |
| WO | WO 2011085270 A1 | 7/2011 |

OTHER PUBLICATIONS

3GPP TS 36.321 V10.2.0 (Jun. 2011), "3$^{rd}$ Generation Partnership Project; Technical Specification Group Radio Access Network; Evolved Universal Terrestrial Radio Access (E-UTRA); Medium Access Control (MAC) Protocol Specification (Release 10)", 54 pgs.

3GPP TS 36.211 V10.2.0 (Jun. 2011) "3rd Generation Partnership Project; Technical Specification Group Radio Access Network; Evolved Universal Terrestrial Radio Access (E-UTRA); Physical Channels and Modulation (Release 10)"; 103 pages; 3rd Generation Partnership Project (3GPP); Mobile Competence Centre; 650, Route des Lucioles; F-06921 Sophia-Antipolis Cedex; France.

3GPP TS 36.331 V10.2.0 (Jun. 2011) "3rd Generation Partnership Project; Technical Specification Group Radio Access Network; Evolved Universal Terrestrial Radio Access (E-UTRA); Radio Resource Control (RRC); Protocol specification (Release 10)"; 294 pages; 3rd Generation Partnership Project (3GPP); Mobile Competence Centre; 650, Route des Lucioles; F-06921 Sophia-Antipolis Cedex; France.

Nokia Corporation, et al: "LTE Carrier Aggregation Enhancements—Performance Part"; RP-110451; 3GPP TSG RAN Meeting #51; Kansas City, USA, Mar. 15-18, 2011; 6 pages; 3rd Generation Partnership Project (3GPP); Mobile Competence Centre; 650, Route des Lucioles; F-06921 Sophia-Antipolis Cedex; France.

Nokia Corporation, et al: "LTE Carrier Aggregation Enhancements—Core Part"; RP-110451; 3GPP TSG RAN Meeting #51; Kansas City, USA, Mar. 15-18, 2011; 9 pages; 3rd Generation Partnership Project (3GPP); Mobile Competence Centre; 650, Route des Lucioles; F-06921 Sophia-Antipolis Cedex; France.

Nokia Corporation, et al: "LTE Carrier Aggregation Enhancements—Feature Part"; RP-110451; 3GPP TSG RAN Meeting #51; Kansas City, USA, Mar. 15-18, 2011; 6 pages; 3rd Generation Partnership Project (3GPP); Mobile Competence Centre; 650, Route des Lucioles; F-06921 Sophia-Antipolis Cedex; France.

* cited by examiner

DISCONTINUOUS RECEPTION FOR CARRIER AGGREGATION

This disclosure relates to carrier aggregation and more particularly to timings of discontinuous reception (DRX) for carrier aggregation in a communication system.

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). The wireless systems can typically be divided into cells, and are therefore often referred to as cellular systems. A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. Examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. The various development stages of 3GPP specifications are referred to as releases. Further development of LTE are sometimes referred to as LTE Advanced (LTE-A).

A feature of LTE is that it is capable of providing carrier aggregation. In carrier aggregation a plurality of carriers are aggregated to increase bandwidth. Thus two or more component carriers (CCs) can be aggregated in order to support wider transmission bandwidths and/or for spectrum aggregation. An example of carrier aggregation where five 20 MHz component carriers are aggregated to provide a up to 100 MHz carrier is shown in FIG. 1. Carrier aggregation can be used to increase performance. In carrier aggregation (CA) it is possible to configure a user equipment (UE) to aggregate a different number of CCs originating from the same eNB and also of possibly different bandwidths in the uplink (UL) and the downlink (DL). It is also possible to configure a user equipment to support component carriers by different base stations and cells to provide an aggregate carrier.

3GPP has defined the concepts of user equipment (UE) specific primary cells (PCell) and secondary cells (SCells). A primary component carrier would be provided by a primary cell (PCell) where the user equipment performs radio resource control (RRC) connection establishment, and can thus be foreseen as the cell governing the link. Thus one of the plurality of serving component carriers configured for use by a communication device can be selectively used for operation such as security, non-access stratum (NAS) mobility and the transmission of the physical uplink control channel (PUCCH). A base station (BS) can utilize a band as a primary carrier or PCell where the base station can provide stable access for a communication device. The other component carriers configured for use by the communication device are known as secondary cells or SCells. Secondary cells can be added to the primary carrier from other bands in accordance with the current carrier aggregation (CA) schemes.

A feature of wireless systems is a discontinuous reception (DRX) mode that is sup-ported e.g. in the long term evolution (LTE) of 3GPP standards. DRX is typically utilised to conserve battery power of devices, to save on wireless resources, and to increase overall system capacity. An example of a DRX cycle is shown in FIG. 2. As shown, the cycle contains active (On duration) and non-active (opportunity for DRX) periods. A communication device shall monitor for a control channel during the active period.

In DRX operation various timers can be provided for example for controlling the inactivity periods, retransmissions and/or the activity periods and so on. The timers can be maintained for active time for the user equipment to monitor physical downlink control channel (PDCCH). Number of subframes is counted for the purposes of the timer functions. For E-UTRAN time division duplexing (TDD), only PDCCH-subframes, typically DL and Downlink Pilot TimeSlot (DwPTS) subframes, may need to be counted for the timers. For example, a DRX inactivity timer is used to specify the number of consecutive PDCCH-subframe(s) after successfully decoding a PDCCH indicating an initial UL or DL user data transmission for a given device.

Wth carrier aggregation (CA), common DRX has been agreed in 3GPP so that same DRX configuration and operation applies to all serving cells. Common UL/DL TDD configuration among all components carriers is supported for Release 10. Release 11 introduces CC/cell specific UL/DL configuration on different bands with a common DRX scheme.

FIG. 3 shows an example of different TDD configurations between PCell and SCell. As can be seen, a subframe for a PCell may be for downlink whereas a subframe for SCell may be for uplink, or vice versa, see subframes #3, #4, #8 and #9. In view of cell specific UL/DL TDD configuration a mechanism is needed to ensure that the common DRX works. For example, a mechanism may need to be provided to ensure that a base station and a communication device have a common understanding whether or not subframes that are configured for uplink for a cell while downlink configuration is used for another cell should be counted as PDCCH-subframes.

It is noted that the above discussed issues are not limited to any particular communication environment, but may occur in any appropriate communication system where carrier aggregation may be provided.

Embodiments of the invention aim to address one or several of the above issues.

In accordance with an embodiment there is provided a method for a device capable of carrier aggregation, comprising receiving at least two different time division duplexing configurations for different serving cells and operating at least one timer function associated with discontinuous reception from the serving cells based on counting of subframes of the received at least two different configurations according to a predefined rule of counting.

In accordance with an embodiment there is provided a method for controlling communications by a device capable of carrier aggregation, comprising sending from serving cells to the device at least two different time division duplexing configurations, wherein the subframes of the at least two different configurations are counted for purposes of operating at least one timer function according to a predefined rule of counting, and controlling discontinuous communications by the serving cells with the device based on the predefined rule of counting.

In accordance with an embodiment there is provided an apparatus for controlling carrier aggregation, the apparatus comprising at least one processor, and at least one memory including computer program code, wherein the at least one memory and the computer program code are configured, with the at least one processor, to facilitate receiving of at least two different time division duplexing configurations for different serving cells and operate at least one timer function associated with discontinuous reception from the serving cells based on counting of subframes of the received at least two different configurations according to a predefined rule of counting.

In accordance with a yet further embodiment there is provided an apparatus for controlling carrier aggregation, the apparatus comprising at least one processor, and at least one memory including computer program code, wherein the at least one memory and the computer program code are configured, with the at least one processor, to cause sending to the device by serving cells at least two different time division duplexing configurations, wherein the subframes of the at least two different configurations are counted for purposes of operating at least one timer function according to a predefined rule of counting, and control discontinuous communications by the serving cells with the device based on the predefined rule of counting.

In accordance with a more detailed embodiment time division duplexing configuration of a primary cell of the serving cells is used as the basis for counting of subframes.

In accordance with another embodiment a serving cell with most downlink sub-frames in its configuration is determined and the configuration of the determined serving cell is used as the basis for counting of subframes.

In accordance with an embodiment an instance of a downlink subframe in configuration from any serving cell is counted as a subframe for timing purposes.

In accordance with an embodiment only a subframe where a downlink subframe is present in all received configurations is counted as a subframe for timing purposes.

A downlink subframe by a secondary cell that is cross scheduled by another cell may be not be counted as a subframe for timing purposes.

Discontinuous reception active time of the device may be controlled based on the counting.

The subframes counted for the timing purposes may include downlink pilot time slot and downlink subframes.

The timer function may comprise at least one of an inactivity timer, retransmission timer, and on-duration timer.

A device and/or access node and/or a communication system comprising an apparatus configured to provide at least one of the embodiments can also be provided. The device may comprise a communication device such as a user equipment or another node capable of wireless communication. The access node may comprise a base station, a device-to-device node or a relay node.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

Figure 1:
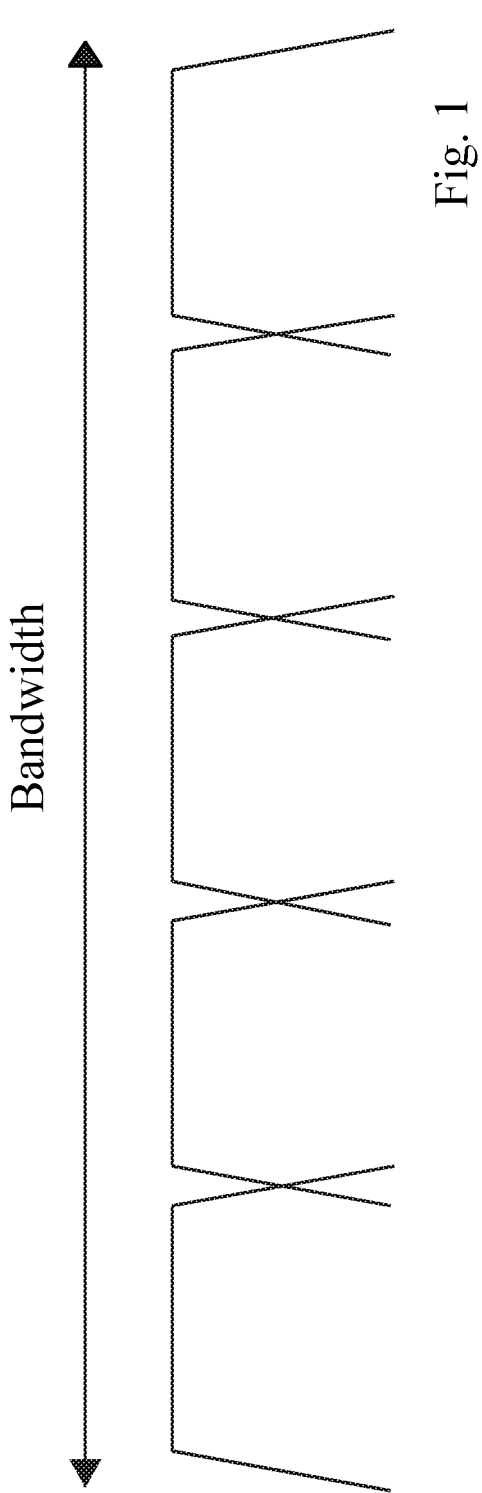
FIG. 1 is an example of carrier aggregation.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 4, device 20 of FIG. 5 and control apparatus 30 of FIG. 6 to assist in understanding the described examples.

A communication device can be used for accessing various services and/or applications provided via a communication system. In wireless communication systems the access is provided via a wireless access interface between wireless communication devices and an appropriate access system. A device may access wirelessly a communication system via a base station. A base station site can provide one or more cells of a cellular system. In the FIG. 4 example, a base station 12 is shown to provide three cells 1, 2 and 3 on different carriers. As explained above, in carrier aggregation one of the serving cells is primary cell (PCell) whereas the other serving cells are secondary cells (SCells). Each mobile device 20 and base station may have one or more radio channels open at the same time and may receive signals from more than one source.

Figures 3, 7:
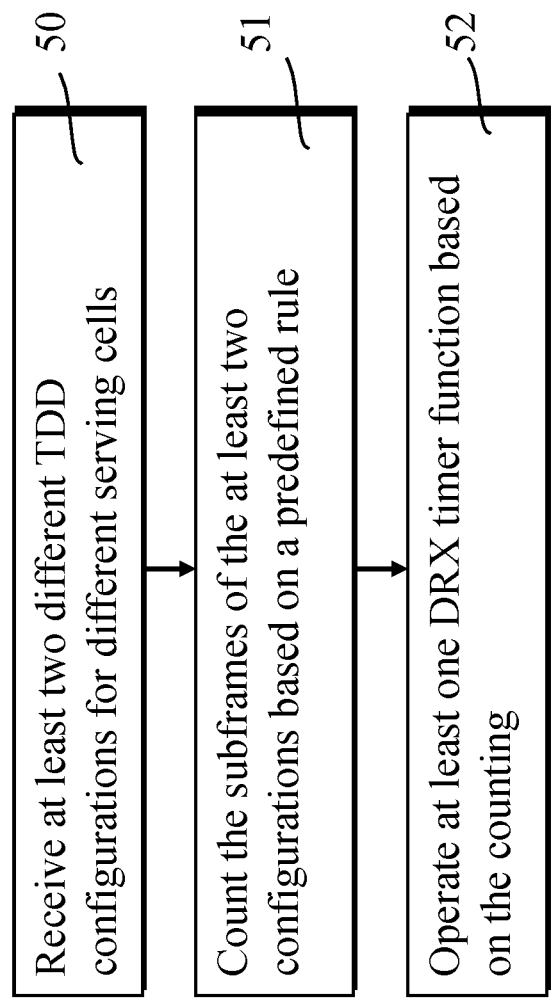
FIG. 3 shows an example of different TDD configurations for different cells.
FIG. 7 is a flowchart in accordance with an embodiment.
Figure 4:
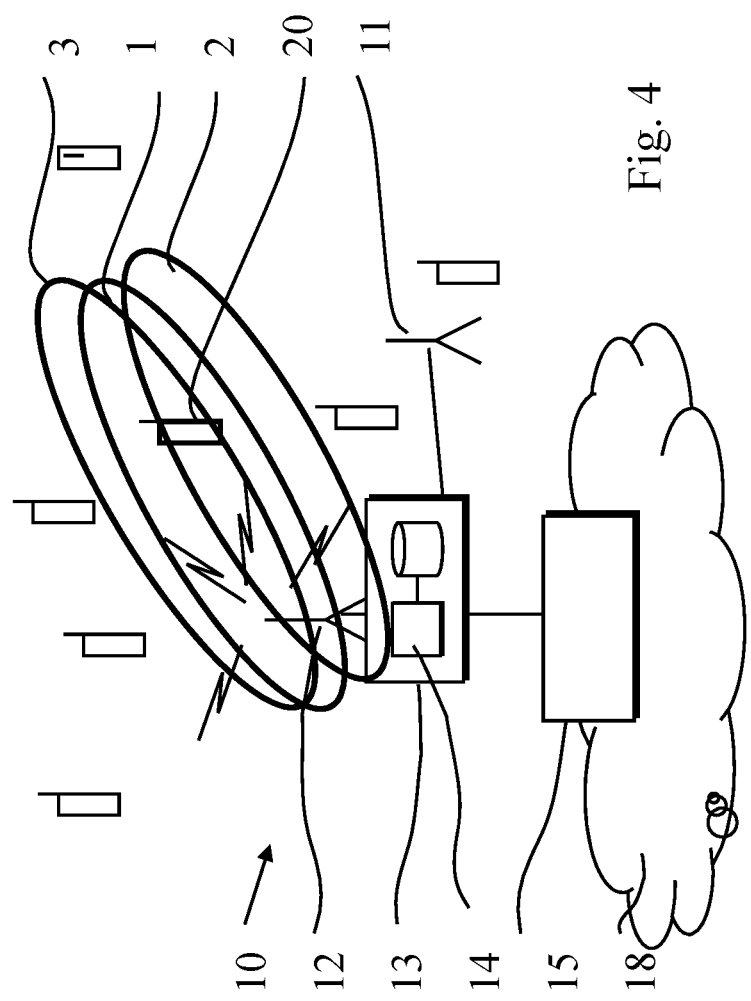
FIG. 4 shows a schematic example of a system where the invention may be implemented.

It is noted that at least one of the serving cells 1 to 3 of FIG. 4 can be provided by means of remote radio heads of base station 12. Also, at least one of the carriers may be provided by a station that is not co-located at base station 12 but could only be controlled by the same control apparatus as the other cells. This possibility is denoted by station 11 in FIG. 4. For example, control apparatus 13 could be used to control at least one further station, for example an intra-eNB. Interaction between the different stations and/or controllers thereof may also be arranged otherwise, for example if a station is provided as an inter-site eNB. For the purposes of understanding this disclosure it is sufficient to assume that a controller of a cell has enough information for all of the aggregated carriers (cells). An example of an aggregated carrier comprising a plurality of carriers is shown in FIG. 1 and an example of the subframe configurations for two serving cells is shown in FIG. 3.

A base station is typically controlled by at least one appropriate controller so as to enable operation thereof and management of mobile communication devices in communication with the base station. The control entity can be interconnected with other control entities. In FIG. 4 such control apparatus is shown to be provided by block 13. An appropriate control apparatus may comprise at least one memory, at least one data processing unit and an input/output interface. The control apparatus is thus typically provided with memory capacity and at least one data processor 14. It shall be understood that the control functions may be distributed between a plurality of controller units. The controller apparatus for a base station may be configured to execute an appropriate software code to provide the control functions as explained below in more detail.

In the FIG. 4 the base station node 12 is connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can access a communication system based on various access techniques, such as code division multiple access (CDMA), or wideband CDMA (WCDMA). The latter technique is used by communication systems based on the third Generation Partnership Project (3GPP) specifications. A non-limiting example of mobile architectures where the herein described principles may be applied is known as the Evolved Universal Terrestrial Radio Access Network (E-UTRAN). A non-limiting example of base station of a cellular system is what is termed as a NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices.

Figure 5:
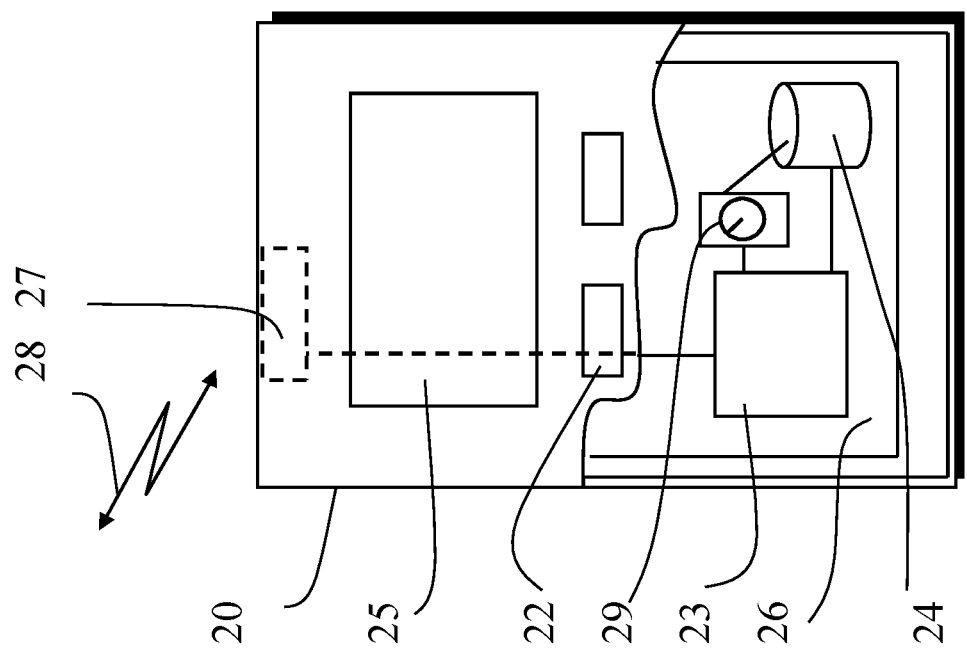
FIG. 5 shows an example of a communication device.

FIG. 5 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

Figure 2:
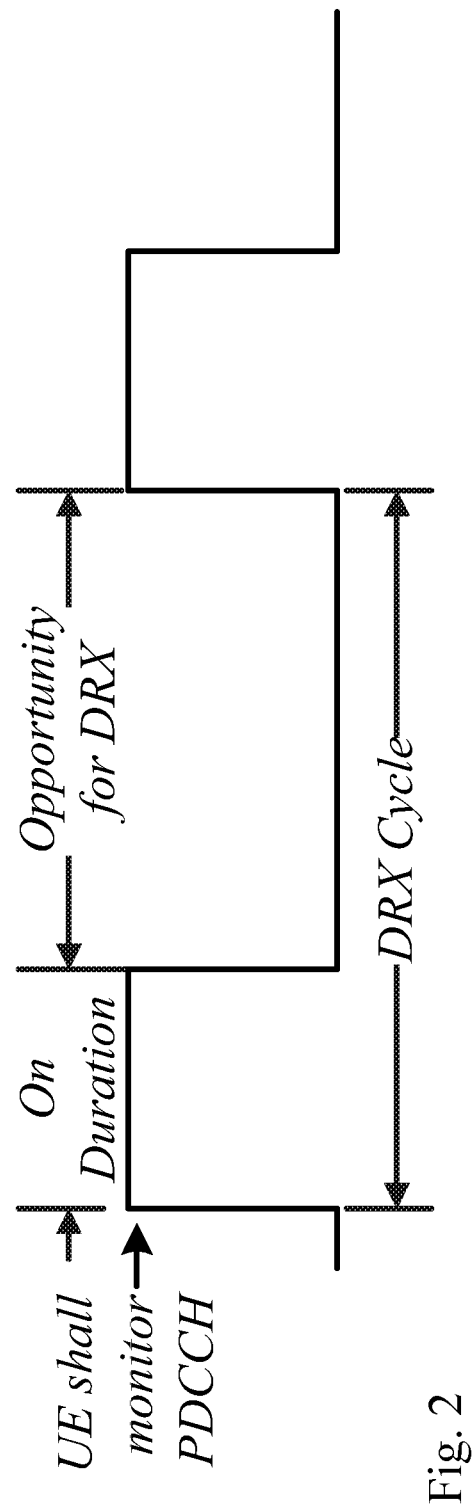
FIG. 2 shows an example of a DRX cycle.

A mobile device is typically provided with at least one data processing entity 23, at least one memory 24 and other possible components 29 for use in software and hardware aided execution of tasks it is designed to perform, including control of access to and communications via carrier aggregation. The data processing, storage and other relevant control apparatus can be provided on an appropriate circuit board and/or in chipsets. This apparatus is denoted by reference 26. The apparatus 26 can comprise at least one timer function 29. For example, in relation to DRX operation one or more DRX operation timers can be provided by timer function 29 for controlling inactivity periods (e.g. drx-InactivityTimer), retransmissions (e.g. drx-RetransmissionTimer), and activity periods (e.g. onDurationTimer) and so on. The timer or timers can be operated so that they are maintained for active time for the user equipment to monitor a control channel such as a physical downlink control channel (PDCCH), as shown in FIG. 2.

The user may control the operation of the device 20 by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 5 transceiver apparatus is designated schematically by block 27. The transceiver apparatus is provided with cognitive radio capability. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

Figure 6:
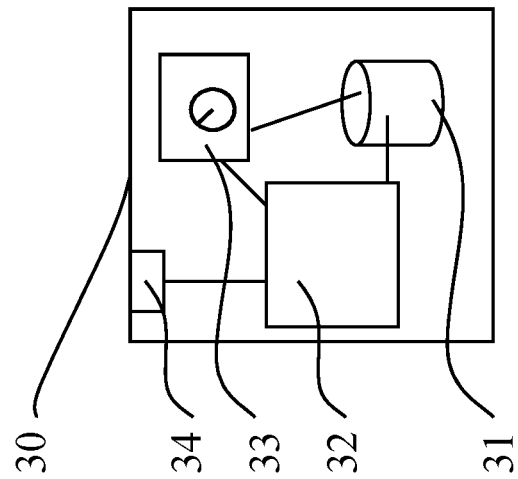
FIG. 6 shows an example of a control apparatus.

FIG. 6 shows an example of a control apparatus 30 for an access node, for example to be coupled to and/or for controlling a station of a radio service area, for example one of the nodes 11 or 12 of FIG. 4. The control apparatus 30 can be arranged to provide control on configurations, information processing and/or communication operations. A control apparatus in accordance with FIG. 6 can be configured to provide control functions in association with generation, communications, rule interpretations of information regarding carrier aggregation, monitoring and/or other operations. The control apparatus 30 comprises at least one memory 31, at least one data processing unit 32, 33 and an input/output interface 34. Element 33 is shown to be provided with at least one timer for the purposes of controlling communications with communication devices. The timer function 33 at the controller 30 and the timer function 29 at the communication device 20 are adapted to maintain the same timers to ensure a common active time to enable the controller scheduling communications by the communication device. Via the interface the control apparatus can be coupled to the relevant node. The control apparatus 30 can be configured to execute an appropriate software code to provide the control functions.

The system and the communication devices can be arranged to support discontinuous reception (DRX) by the communication devises, for example in accordance with the long term evolution of 3GPP standards. An example of a DRX cycle is shown in FIG. 2. In DRX operation the timer functions 29 of the communication device and 33 of the control apparatus can be used for controlling inactivity periods, retransmissions and/or activity periods and so on. The timers can be maintained for active time for the user equipment to monitor physical downlink control channel (PDCCH). For E-UTRAN time division duplexing (TDD), only PDCCH-subframes, typically DL and Downlink Pilot TimeSlot (DwPTS) subframes are counted for the DRX timers. For example, a DRX inactivity timer can be used to specify a number of consecutive PDCCH-subframe(s) after successfully decoding a PDCCH indicating an initial UL or DL user data transmission for a given communication device.

FIG. 3 shows an example of different TDD configuration between PCell and SCell. In FIG. 3 "D" denotes downlink, "U" denotes uplink and "S" denotes a subframe with three fields comprising DwPTS, guard period (GP) and Uplink Pilot TimeSlot (UpPTS). With carrier aggregation (CA), common DRX can be used such that same DRX configuration and operation applies to all serving cells. As can be seen, a subframe for a PCell may be for downlink (subframes D) whereas the corresponding subframe for SCell with different configuration may be for uplink (subframes U), or vice versa, see subframes #3, #4, #8 and #9.

The inventors have recognized that because of this a situation may occur where the communication device can count the subframes differently from the manner they are counted by a control apparatus at the network side. This can result erroneous operation. The following describes certain examples how it can be ensured in a cell specific UL/DL TDD configuration that the common DRX works. For example, a mechanism can be provided to ensure that the base station and the user equipment can be provided with a common understanding whether or not subframes that are configured for uplink for a cell while downlink configuration is used for another cell should be counted as PDCCH-subframes.

FIG. 7 illustrates a method for use by a device capable for carrier aggregation for ensuring common timing with the network access point. In accordance with the method at least two time division duplexing carriers with different uplink and downlink time division duplexing configurations for different serving cells are received at 50. Subframes of the at least two control channels are then counted at 51 for timing purposes in accordance with a predefined rule. At least one timer associated with discontinuous reception can be operated at 52 based on the counting. In particular, at least one timer can be maintained for DRX active time based on a predefined rule.

Correspondingly, active time for discontinuous communications by a device capable for carrier aggregation can be controlled by a network controller based on the maintenance of the timers. When configuring the device with at least two serving cells with different time division duplexing configurations, the timers can be maintained in accordance with the same predefined rule as used by the device. As the discontinuous communications with the device is controlled based on similarly performed count at each end of the link a common timing can be determined and used at both ends of the link.

For example, in view of FIG. 3, a mechanism can be provided to ensure common understanding between the network and the user equipment how subframes #3, #4, #8, #9 are to be treated in the counting. More detailed alternatives for ensuring that a base station site, for example an eNB, and a user equipment (UE) both count the subframes in similar manner for timing purposes, and thus use the same DRX active time are described below.

In accordance with an embodiment the UL/DL configuration of the primary cell is used as the basis of counting PDCCH-subframes. In FIG. 3 scenario this would mean eight countable subframes #0, #1, #3, #4, #5, #6, #8 and #9.

In accordance with another embodiment it is determined which of the serving cell that has most of the DL subframes, and the configuration of the selected serving cell is used for as the basis of PDCCH-subframe counting. In FIG. 3 scenario this would mean selection of the PCell as it has six DL subframes compared to SCells two, and thus eight countable subframes #0, #1, #3, #4, #5, #6, #8 and #9 are provided.

In accordance with an embodiment any subframe with DL subframe on any serving cell is counted as PDCCH-subframe. In FIG. 3 scenario there would be eight subframes (no additonal subframes are added by the SCell as all of its DL subframes coincide with the DL subframes of the PCell).

In accordance with an embodiment only a subframe with DL subframe on all of the serving cells is counted as PDCCH-subframe. In FIG. 3 scenario this would mean four countable subframes #0, #1, #5 and #6, as S subframes #1 and #6 are also considered as countable subframes.

Cross carrier scheduling can be taken into account by the rule. For example, if a subframe with DL subframe only on serving cells is cross scheduled by another serving cell, the subframe is not counted as a PDCCH-subframe. Such rule may be applied for example in situation where there is a DL subframe only on a serving cell that is not a PCell which is cross scheduled by another cell. For example, consider FIG. 3 where the configurations for primary cell (PCell) and secondary cell (SCell) are switched such that the lower configuration would be for the primary cell. The primary cell would then be with the four countable subfames (D+S frames #0, #1, #5 and #6) and the secondary cell with eight countable subframes (D+S subframes #0, #1, #3, #4, #5, #6, #8 and #9). If the secondary cell of this scenario is cross scheduled by primary cell, subframes #3, 4, 8, 9 are DL subframes for the secondary cell. However, there may not be an appropriate PDCCH in such subframes and therefore these subframes are not counted as PDCCH subframes. This, however, is not the only option and another rule can be provided where such subframes are counted as PDCCH-subframes.

In the embodiments described with reference to 3GPP LTE PDCCH-subframes the timer function can comprise the following DRX timers: drx-InactivityTimer, drx-RetransmissionTimer, and onDurationTimer. The definition of PDCCH-subframe in the current releases of 3GPP TS 36.321 may need to be changed to adopt one or more of the embodiments described above.

The required data processing apparatus and functions of a network control apparatus, a communication device and any other appropriate node or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations of appropriate subframes for the counting, operation of the timers and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to certain architectures, similar principles can be applied to other communication systems where carrier aggregation is provided and the issue of timing may arise. For example, this may be the case in application where no fixed access nodes are provided but a communication system is provided by means of a plurality of user equipment, for example in adhoc networks. Also, the above principles can also be used in networks where relay nodes are employed for relaying transmissions. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method, for a device capable of communicating with at least two different serving cells, comprising:
counting subframes of different time division duplexing uplink-downlink configurations for at least two different serving cells according to a same counting rule for a common discontinuous reception operation to the at least two different serving cells,
wherein the same counting rule counts a subframe as a downlink sub-frame for the common discontinuous reception operation if the subframe is configured as a downlink subframe on any one of the different time division duplexing uplink-downlink configurations for the at least two different serving cells; and
operating at least one timer function for the common discontinuous reception operation based on the counting.

2. A method, for communication between a device and at least two different serving cells, comprising:
controlling, by one or more of the at least two different serving cells with different time division duplexing uplink-downlink configurations, a common discontinuous reception operation at the device to the at least two different serving cells according to a same counting rule over the at least two different serving cells,
wherein at least one timer function is operated for the common discontinuous reception operation based on counting of subframes of the different time division duplexing uplink-downlink configurations for en the at least two different serving cells according to the same counting rule, and
wherein the same counting rule counts a subframe as a downlink sub-frame for the common discontinuous reception operation if the subframe is configured as a downlink subframe on any one of the different time division duplexing uplink-downlink configurations for the at least two different serving cells.

3. The method of claim 1 further comprising using time division duplexing uplink-downlink configuration of a primary cell of the at least two different serving cells as the basis for counting of subframes for the common discontinuous reception operation at the device.

4. The method of claim 1, further comprising
determining a serving cell with most downlink subframes in its time division duplexing uplink-downlink configuration, and
using the time division duplexing uplink-downlink configuration of the determined serving cell as the basis for counting of subframes for the common discontinuous reception operation at the device.

5. The method of claim 1, further comprising counting an instance of a downlink subframe in time division duplexing uplink-downlink configuration from any serving cell as a subframe for timing purposes for the common discontinuous reception operation at the device.

6. The method of claim 1, further comprising counting only a subframe where a downlink subframe is present in all received time division duplexing uplink-downlink configurations as a subframe for timing purposes for the common discontinuous reception operation at the device.

7. The method of claim 1, wherein a downlink subframe by a secondary cell that is cross scheduled by another cell is not counted as a subframe for timing purposes for the common discontinuous reception operation at the device.

8. The method of claim 1, further comprising controlling discontinuous reception active time of the device based on the counting.

9. The method of claim 1, further comprising counting downlink sub-frames and subframes including downlink pilot subframes for the timing purposes.

10. The method of claim 1, wherein the timer function comprises at least one of an inactivity timer, retransmission timer, and on-duration timer.

11. An apparatus, capable of communicating with at least two different serving cells, comprising at least one processor, and at least one memory including computer program code, wherein the at least one memory and the computer program code are configured, with the at least one processor, to at least perform or control the following:
count subframes of different time division duplexing uplink-downlink configurations for at least two different serving cells according to a same counting rule for a common discontinuous reception operation to the at least two different serving cells,
wherein the same counting rule counts a subframe as a downlink sub-frame for the common discontinuous reception operation if the subframe is configured as a downlink subframe on any one of the different time division duplexing uplink-downlink configurations for the at least two different serving cells; and operate at least one timer function for the common discontinuous reception operation based on the counting.

12. An apparatus, for communication between a device and at least two different serving cells, comprising at least one processor, and at least one memory including computer program code, wherein the at least one memory and the computer program code are configured, with the at least one processor, to at least perform or control the following:

control, by one or more of the at least two different serving cells with different time division duplexing uplink-downlink configurations, a common discontinuous reception operation at the device to the at least two different serving cells according to a same counting rule over the at least two different serving cells, wherein at least one timer function is operated for the common discontinuous reception operation by based on counting of subframes of the different time division duplexing uplink-downlink configurations for the at least two different serving cells according to the same counting rule, and wherein the same counting rule counts a subframe as a downlink sub-frame for the common discontinuous reception operation if the subframe is configured as a downlink subframe on any one of the different time division duplexing uplink-downlink configurations for the at least two different serving cells.

13. The apparatus of claim 11, wherein the at least one memory and the computer code are further configured to, with the at least one processor, cause the apparatus to at least perform or control the following:

use the time division duplexing uplink-downlink configuration of a primary cell of the serving cells as the basis for counting of sub-frames for the common discontinuous reception operation at the apparatus.

14. The apparatus of claim 11, wherein the at least one memory and the computer code are further configured to, with the at least one processor, cause the apparatus to at least perform or control the following:

determine a serving cell with most downlink subframes in its time division duplexing uplink-downlink configuration, and use the time division duplexing uplink-downlink configuration of the determined serving cell as the basis for counting of subframes for the common discontinuous reception operation at the apparatus.

15. The apparatus of claim 11, wherein the at least one memory and the computer code are further configured to, with the at least one processor, cause the apparatus to at least perform or control the following:

count an instance of a downlink subframe in time division duplexing uplink-downlink configuration from any serving cell as a subframe for timing purposes for the common discontinuous reception operation at the apparatus.

16. The apparatus of claim 11, wherein the at least one memory and the computer code are further configured to, with the at least one processor, cause the apparatus to at least perform or control the following:

count only a subframe where a downlink subframe is present in all received time division duplexing uplink-downlink configurations as a subframe for timing purposes for the common discontinuous reception operation at the apparatus.

17. The apparatus of claim 11, wherein the at least one memory and the computer code are further configured to, with the at least one processor, cause the apparatus to at least perform or control the following:

ignore a downlink subframe by a secondary cell that is cross scheduled by another cell as a subframe for timing purposes for the common discontinuous reception operation at the apparatus.

18. The apparatus of claim 11, wherein the at least one memory and the computer code are further configured to, with the at least one processor, cause the apparatus to at least perform or control the following:

control discontinuous reception active time of the apparatus based on the counting.

19. The apparatus of claim 11, wherein the at least one memory and the computer code are further configured to, with the at least one processor, cause the apparatus to at least perform or control the following:

count pilot sub-frames and downlink subframes for the timing purposes.

20. The apparatus of claim 11, wherein the timer function comprises at least one of an inactivity timer, retransmission timer, and on-duration timer.

21. A controller for an access node comprising an apparatus in accordance with claim 12.

22. A communication device comprising an apparatus in accordance with claim 11.

23. A communication system comprising an apparatus or a device in accordance with claim 11.

24. A computer program product embodied on a non-transitory computer-readable medium in which a computer program comprising program code is stored that, when being executed by a computer, is configured to perform or carry out the method of claim 1.

* * * * *

UNITED STATES PATENT AND TRADEMARK OFFICE
CERTIFICATE OF CORRECTION

PATENT NO. : 11,184,142 B2
APPLICATION NO. : 14/115884
DATED : November 23, 2021
INVENTOR(S) : Wu et al.

It is certified that error appears in the above-identified patent and that said Letters Patent is hereby corrected as shown below:

In the Claims

In Claim 2: Column 10, Line 7, delete "en".

In Claim 12: Column 11, Line 19, delete "by".

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*